Figure 1:
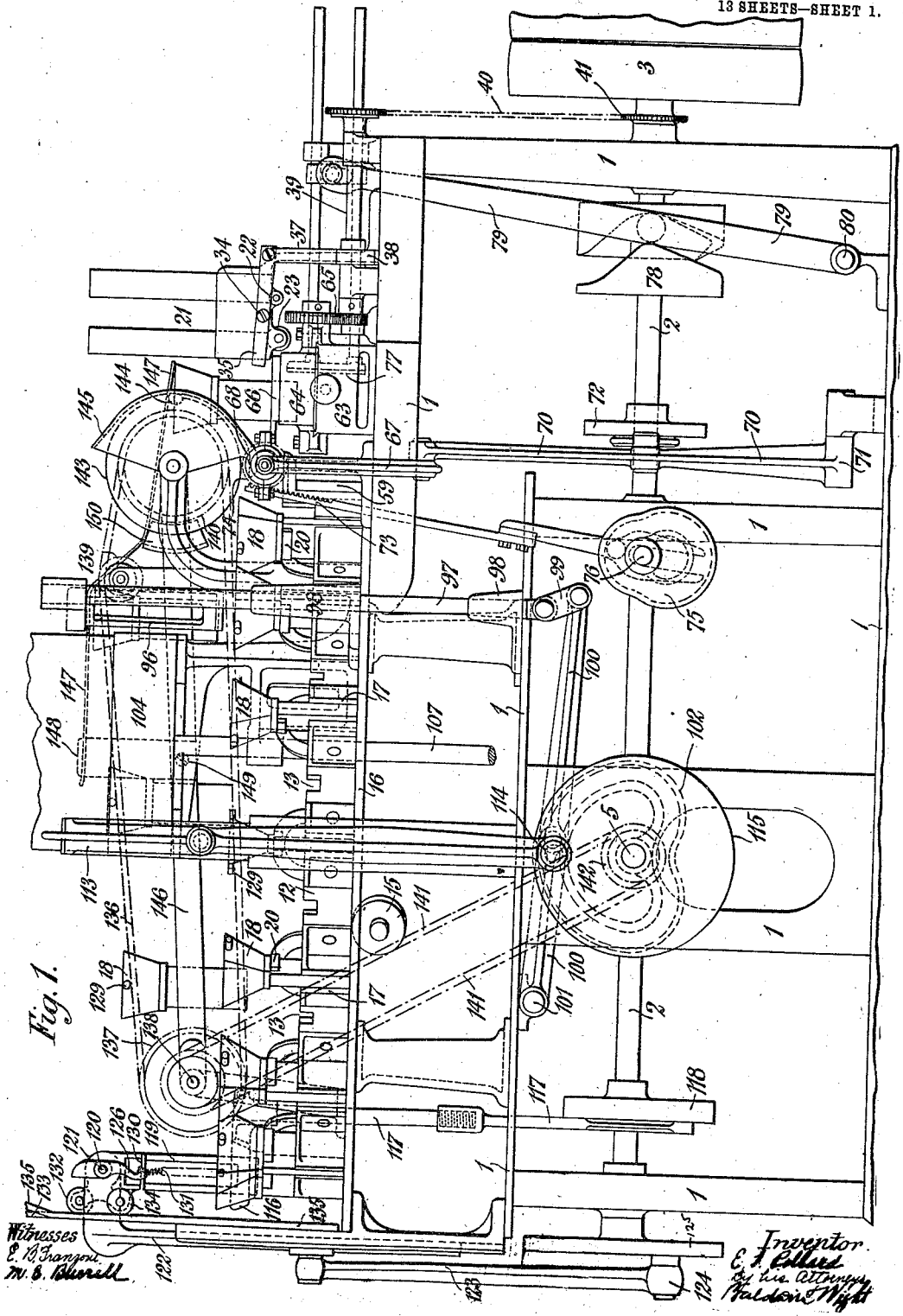

E. T. POLLARD.
PACKETING MACHINE.
APPLICATION FILED DEC. 14, 1909.

956,167.

Patented Apr. 26, 1910.
13 SHEETS—SHEET 1.

E. T. POLLARD.
PACKETING MACHINE.
APPLICATION FILED DEC. 14, 1909.

956,167.

Patented Apr. 26, 1910.
13 SHEETS—SHEET 2.

Witnesses
C. B. Franzoni
M. E. Burrell

Inventor
E. T. Pollard
By his attorneys
Baldwin Wight

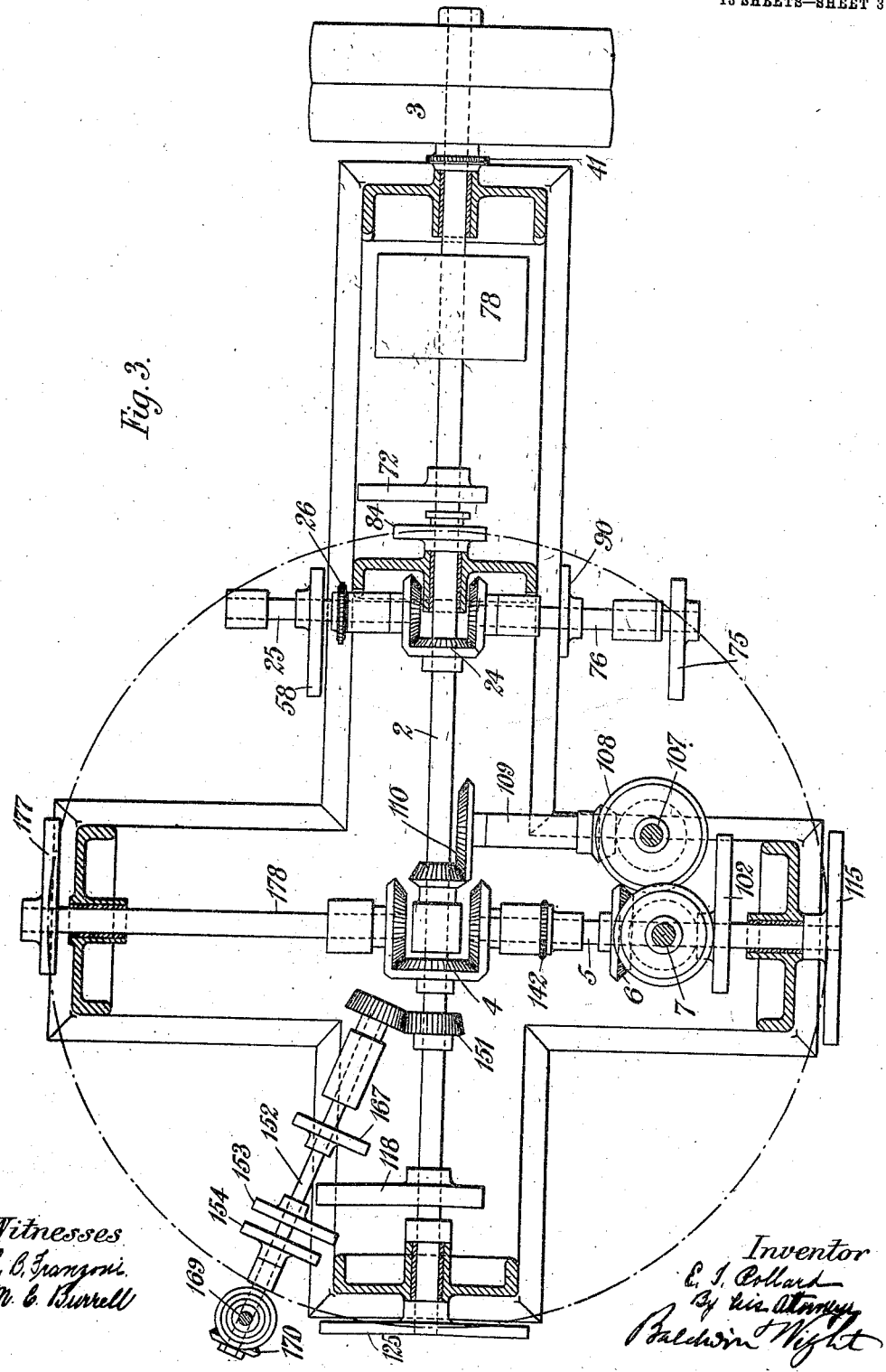

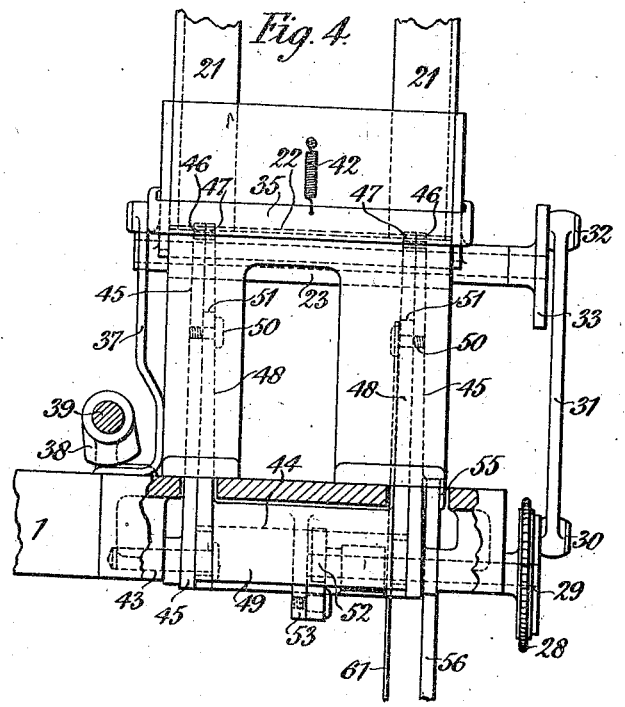

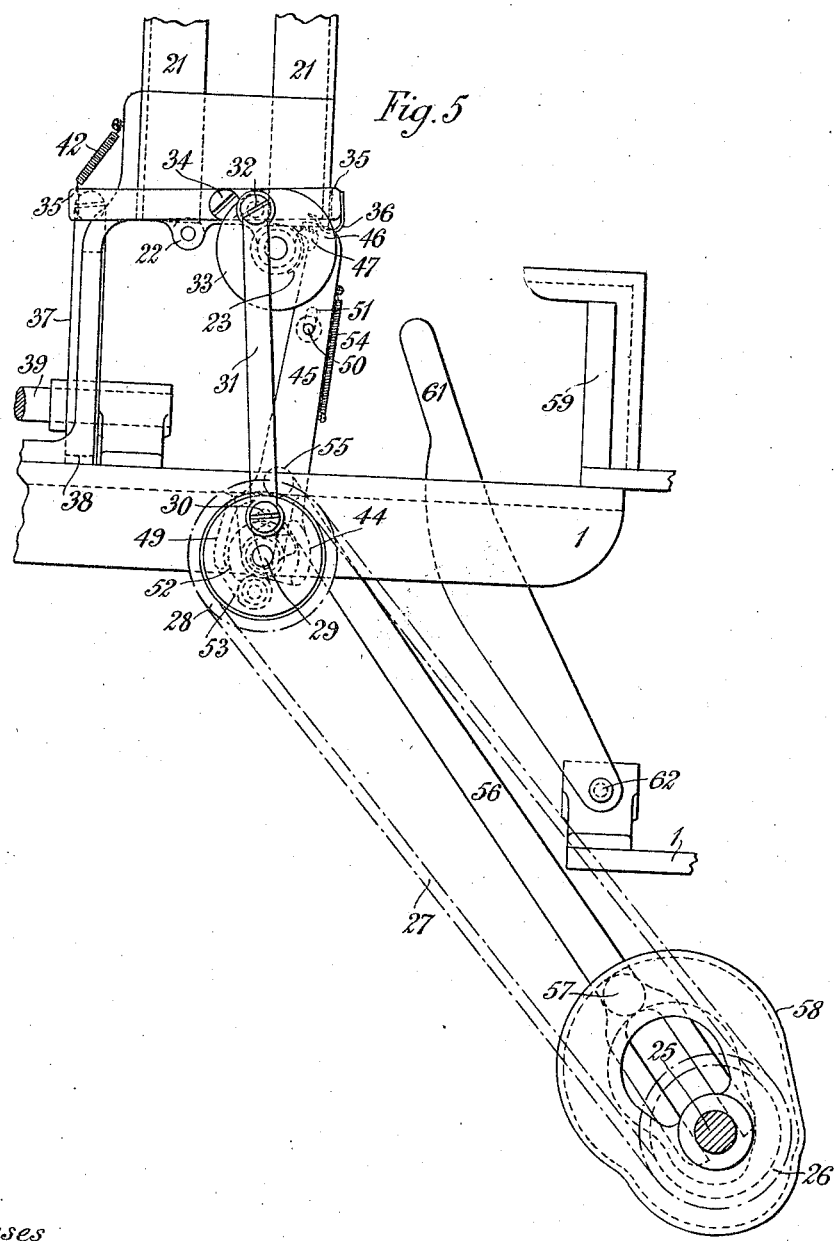

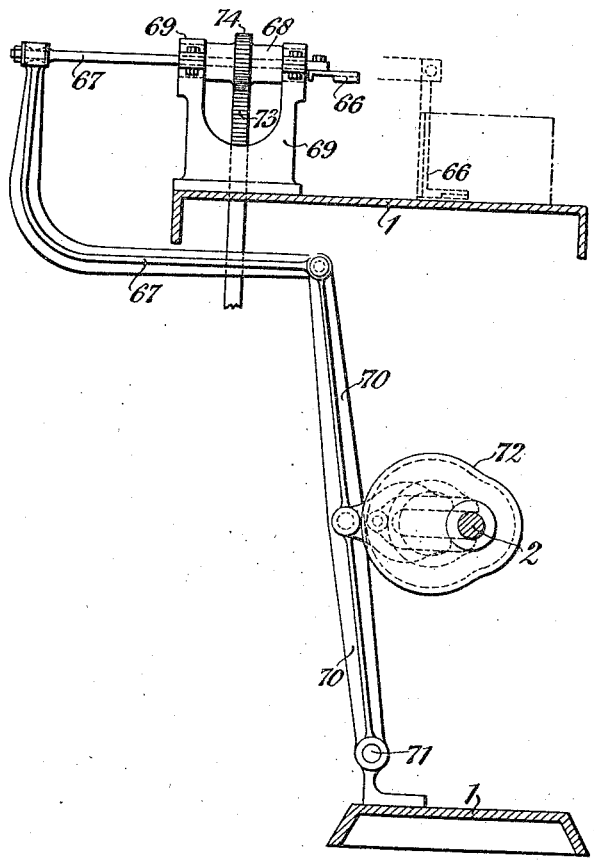

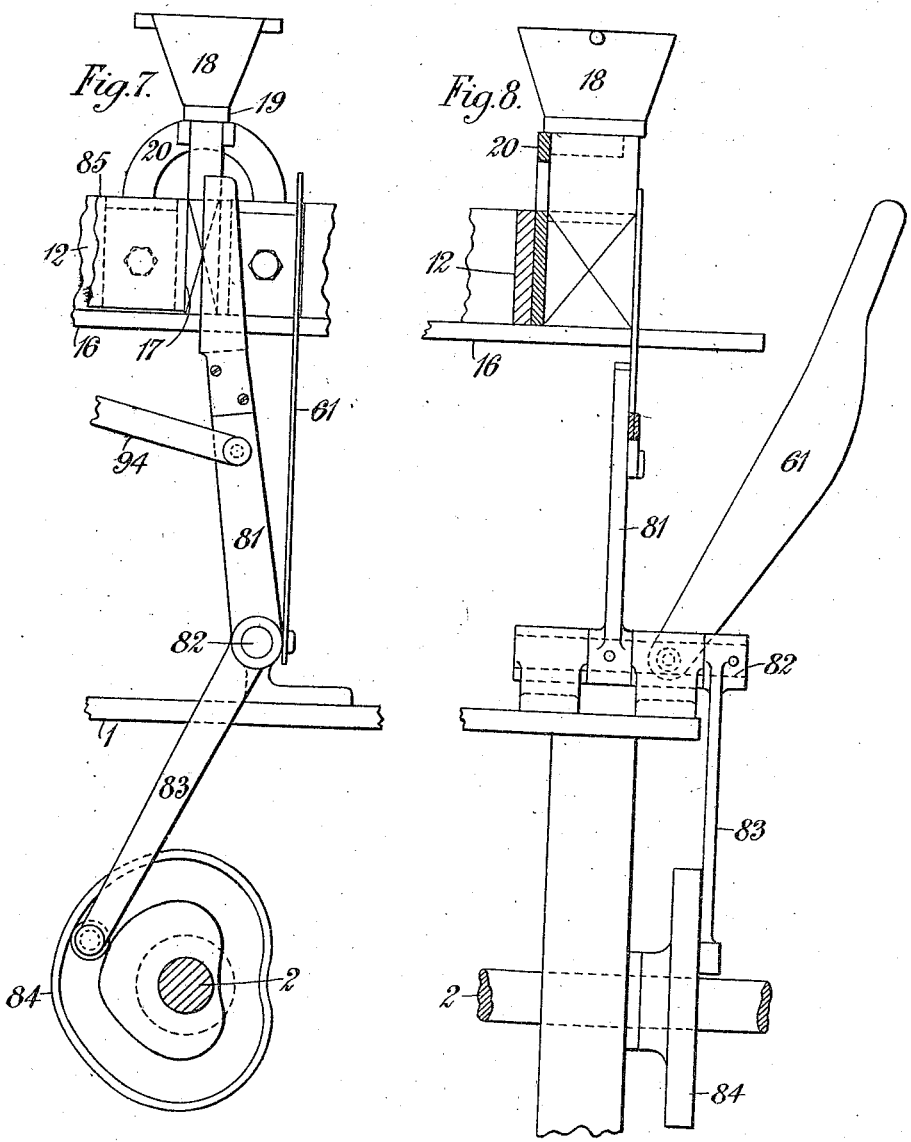

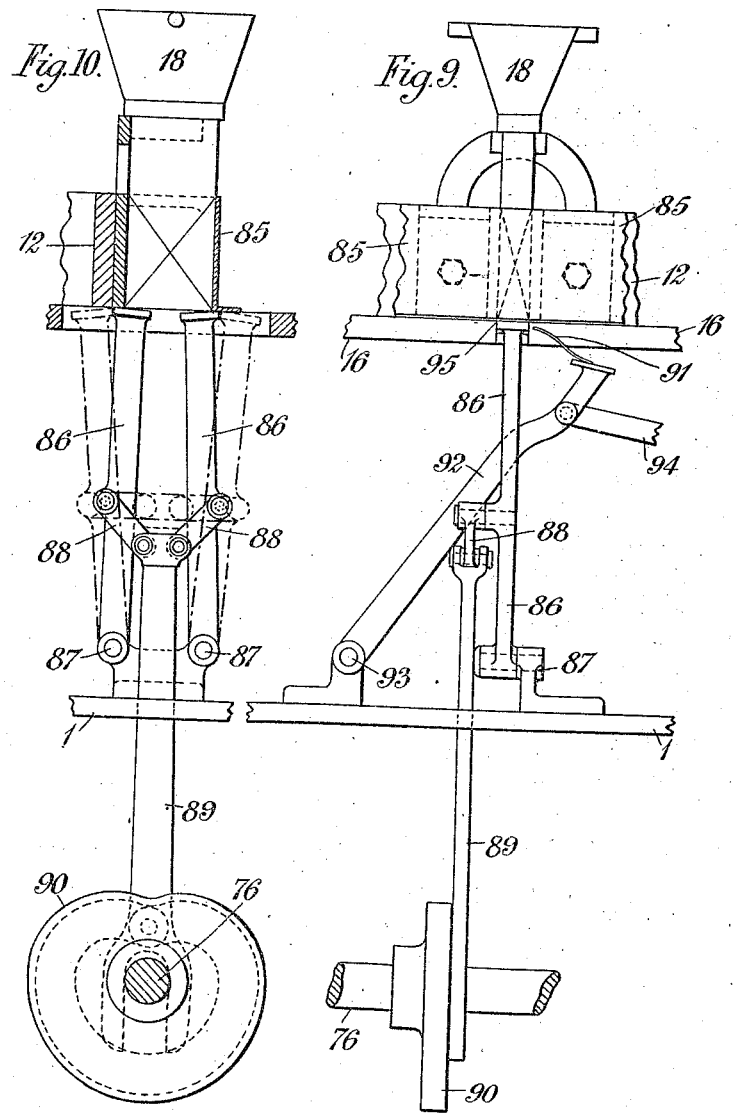

E. T. POLLARD.
PACKETING MACHINE.
APPLICATION FILED DEC. 14, 1909.

956,167.

Patented Apr. 26, 1910.
13 SHEETS—SHEET 9.

Witnesses.
E. B. Franzoni
M. E. Burrell

Inventor.
E. T. Pollard
By his Attorneys
Baldwin & Wight

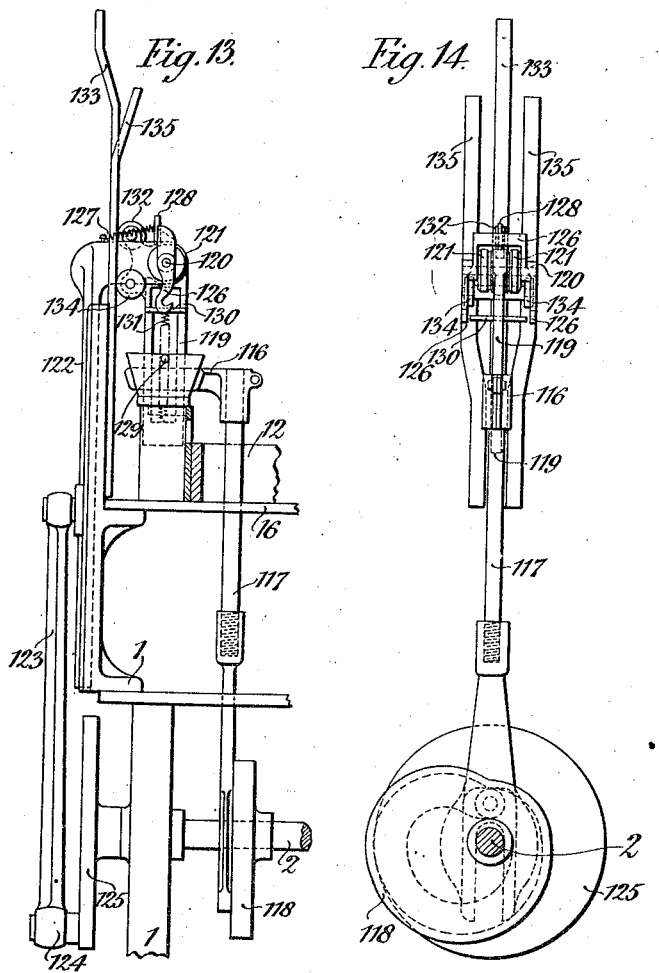

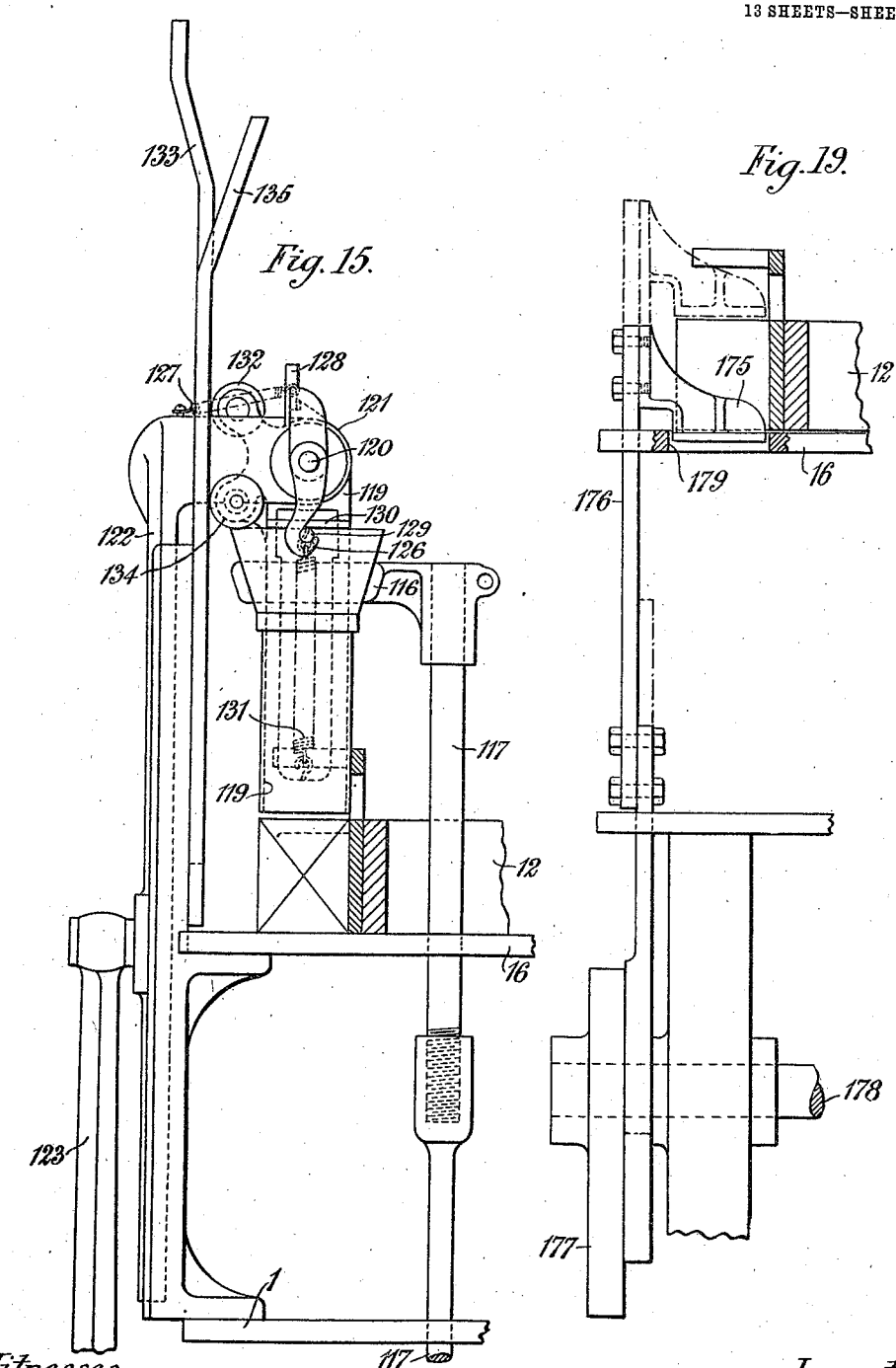

E. T. POLLARD.
PACKETING MACHINE.
APPLICATION FILED DEC. 14, 1909.

956,167.

Patented Apr. 26, 1910.
13 SHEETS—SHEET 12.

E. T. POLLARD.
PACKETING MACHINE.
APPLICATION FILED DEC. 14, 1909.
956,167.
Patented Apr. 26, 1910.
13 SHEETS—SHEET 13.
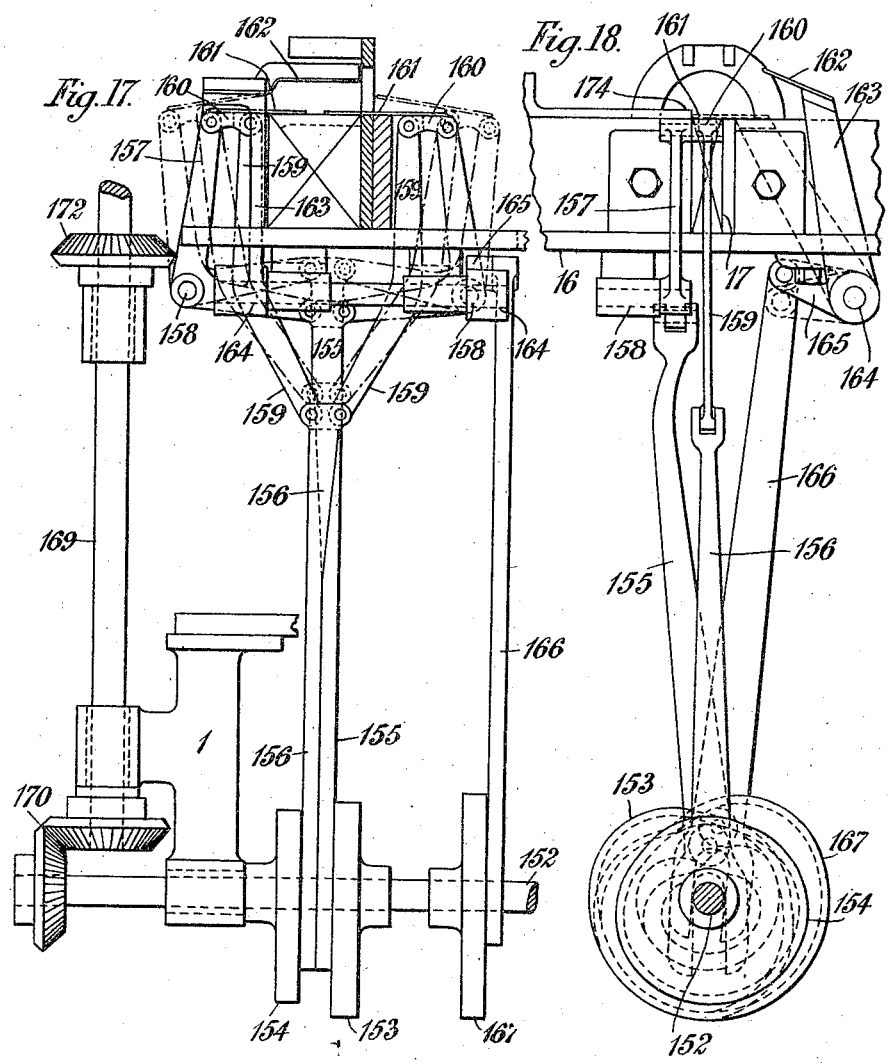

UNITED STATES PATENT OFFICE.

EDWARD THOMAS POLLARD, OF LONDON, ENGLAND, ASSIGNOR TO INTERNATIONAL ENGINEERING COMPANY, LIMITED. OF EDINBURGH, SCOTLAND.

PACKETING-MACHINE.

956,167.  Specification of Letters Patent.  Patented Apr. 26, 1910.

Application filed December 14, 1909. Serial No. 533,038.

*To all whom it may concern:*

Be it known that I, EDWARD THOMAS POLLARD, a citizen of the United States, residing at 7E Hyde Park Mansions, London, England, have invented new and useful Improvements in Packeting-Machines, of which the following is a specification.

This invention relates to packeting machines in which wrappers are folded by folding devices around the lower parts of hoppers or funnels carried by supports or holders arranged around a horizontal ring to which a step by step movement of rotation is imparted. The partially folded wrapper is thus brought beneath the mouth of a chute through which a measured quantity of material may be discharged into the wrapper. The hopper is then lifted out of the wrapper the folding of which is subsequently completed and the package is ejected from the machine, the hopper being returned to the place where it is to be inserted into a support for the formation of another package.

According to the present invention, the funnels, which remain in the molds for half a revolution of the mold ring, are returned to the position in which they are inserted into the molds by a pair of conveying chains running across the mold ring. The funnels are lifted out of the packets to a height above the chains and are then thrown or dropped onto the chains by which they are then conveyed to the other side of the ring and delivered at the right time and in the right position for insertion into the mold ring.

A machine made according to this invention also comprises several new features in the mechanism for the delivery of wrappers, for the folding and pasting thereof and for the delivery of measured quantities of material to the funnels; the wrapper delivery and measuring mechanism being claimed in applications of even date herewith.

The accompanying drawings show a machine made in accordance with this invention.

Figure 2:
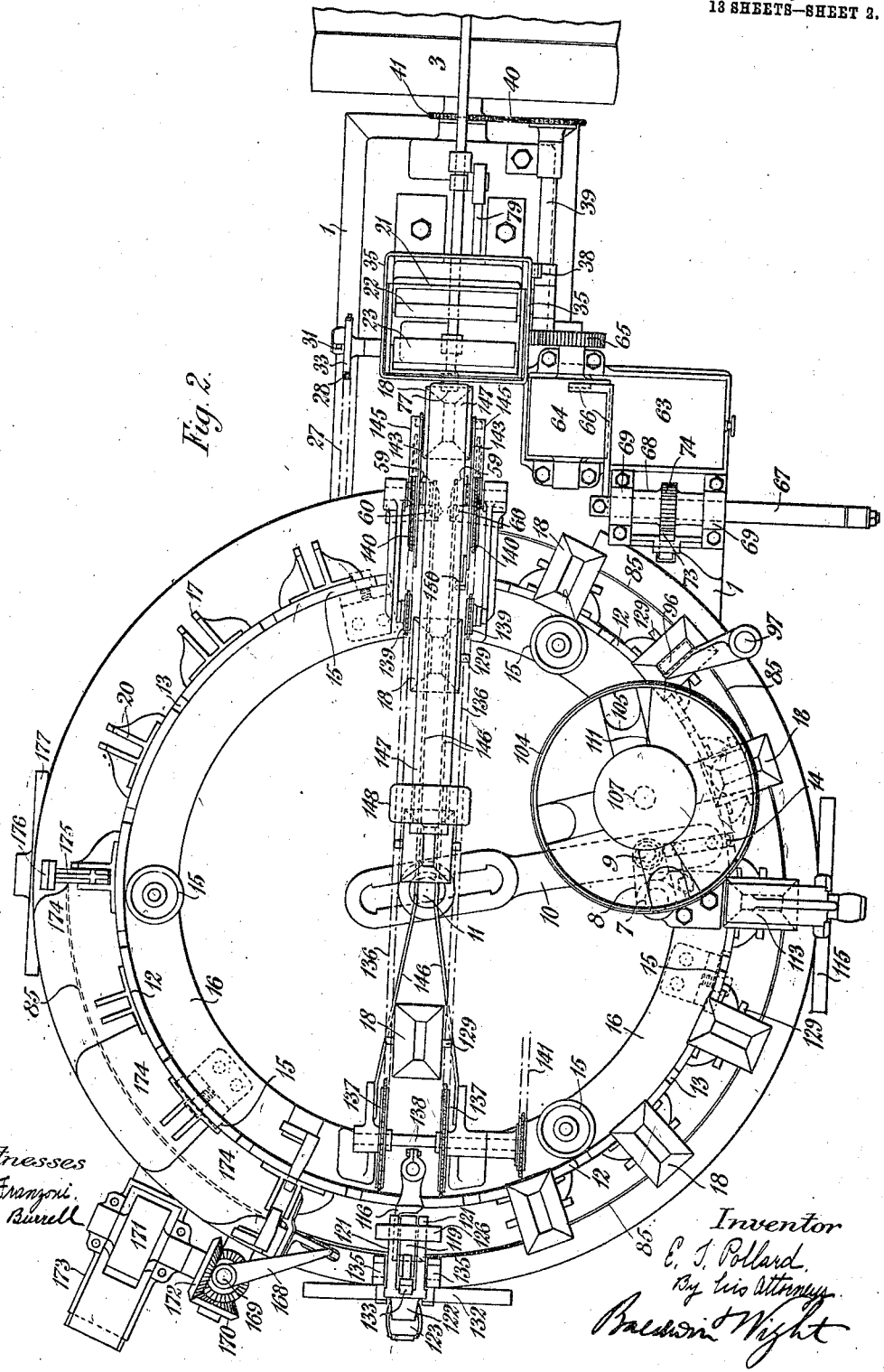
Figure 12:
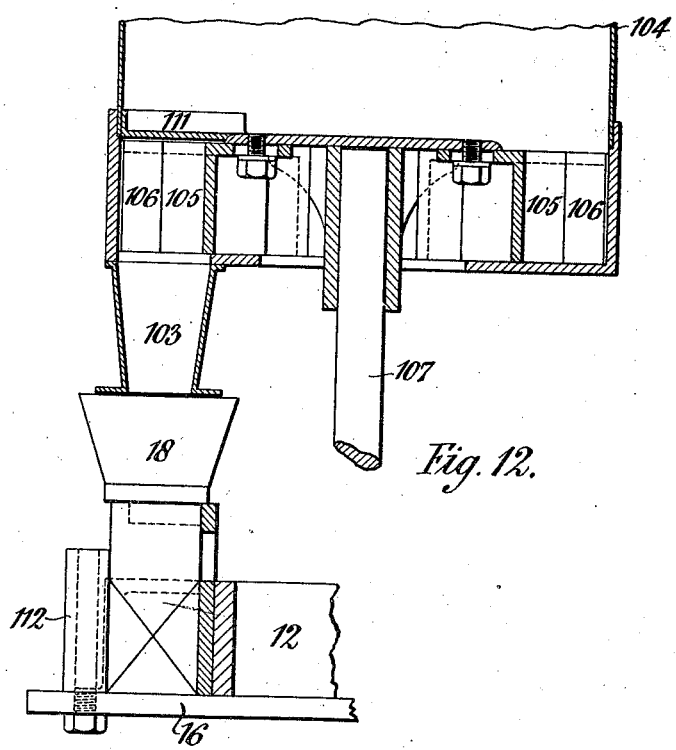
Figure 11:
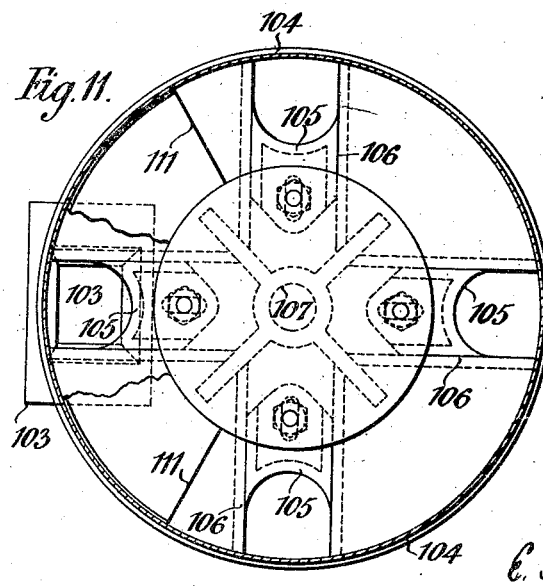
Figure 16:
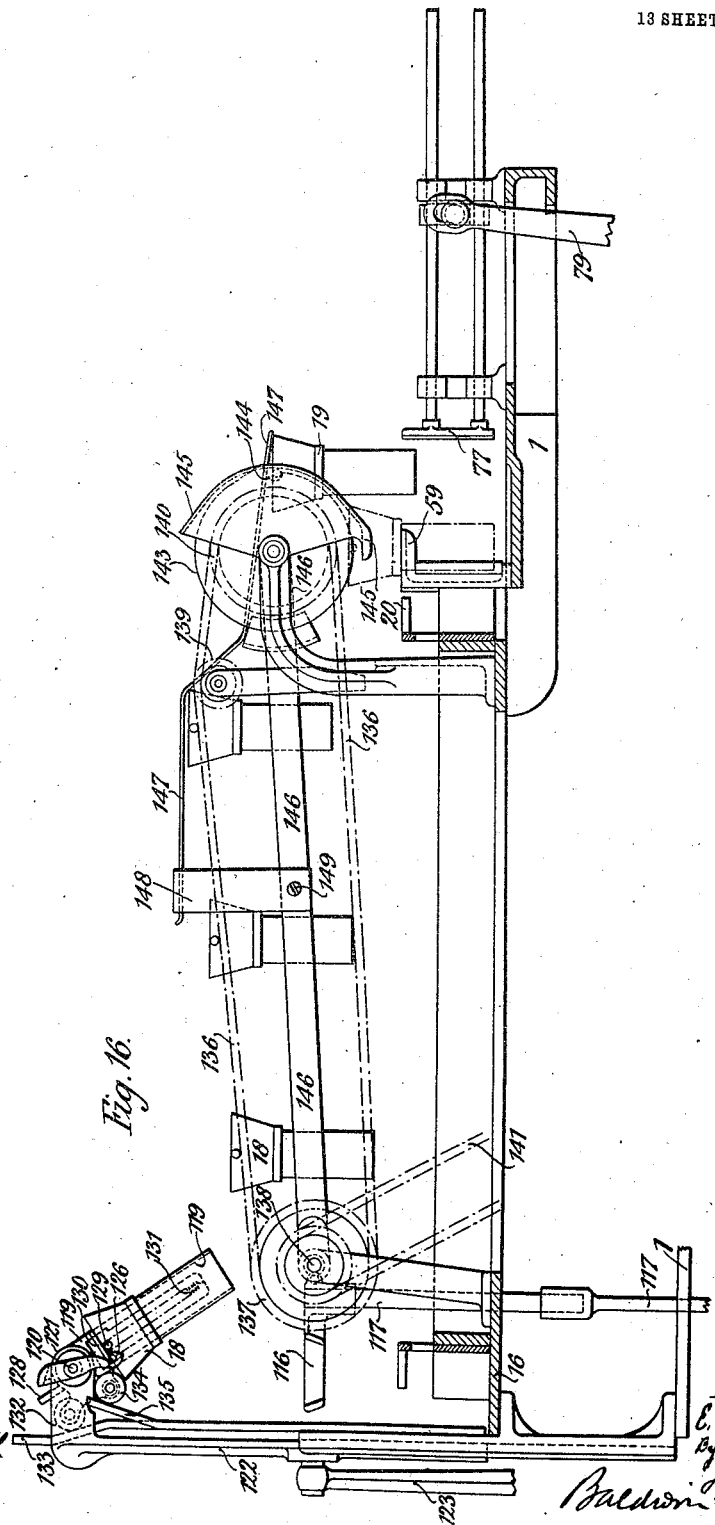

Figure 1 is a side elevation and Fig. 2 a plan. Fig. 3 is a sectional plan showing the mechanism by which motion is conveyed to the various parts. Fig. 4 is an end elevation and Fig. 5 a side elevation of the mechanism for delivering the wrappers. Fig. 6 shows a detail of the mechanism for applying paste to the wrappers. Figs. 7 and 8 are front and side views of the mechanism for folding the side of the packet. Figs. 9 and 10 are similar views of the mechanism for folding the bottom of the packet. Fig. 11 is a plan and Fig. 12 a vertical section of the mechanism for delivering measured quantities of the material. Figs. 13, 14 and 15 give details of the mechanism for lifting the funnels out of the packets and dropping them onto the conveying chains which are seen in Fig. 16. Figs. 17 and 18 are side and front views of the mechanism for closing the packet while Fig. 19 shows the ejector mechanism. Of these figures numbers 1, 2, 3, 6, 13, 14, 16 are to a smaller scale than the others.

In the frame 1 is supported a main shaft 2 which can be rotated by means of a belt pulley 3 and which carries a bevel wheel 4 driving a cross shaft 5 which in its turn drives through bevel gear 6 a vertical shaft 7. On this shaft 7 is a crank 8 engaging a pin 9 on a link 10 slotted to embrace a shed 11 at the center of the horizontal mold ring 12 around the periphery of which are cut sixteen notches 13 into which the tooth shaped end 14 of the link 10 is adapted to enter, the arrangement being such that as the shaft 7 rotates, the tooth 14 enters a notch, moves the ring 12 around clockwise for one-sixteenth of a revolution, recedes from the notch and moves back to engage the next notch. The ring 12 which is supported and centered by rollers 15 on an annular plate 16 carries sixteen molds each of which is formed with two side plates 17 adapted to receive between them a funnel 18 on which is a shoulder 19 which rests while the funnel is in a mold on supports 20 carried by the plates 17.

Rectangular wrappers previously printed if desired and cut to the required size are piled in a box 21 (see Figs. 4 and 5) and rest upon a roller 22 supported by fixed bearings and upon a roughened segment 23. A bevel wheel 24 on the shaft 2 drives a way shaft 25 on which is a sprocket wheel 26, a chain 27 from which passes over a sprocket wheel 28 on a spindle 29 fast with which is a crank pin 30 linked by a link 31 to a pin 32 on a disk 33 fast with the roughened segment, the cranks being so proportioned that the segment is rocked backward and forward. Pivoted at 34 is a strap 35 surrounding the box 21 and carrying at the front thereof fingers 36. From the rear of the strap depends a hook 37 engaged by a wiper 38 on a spindle 39 driven by a chain 40 from a sprocket wheel 41 on the shaft 2. As the segment 23 rocks in an anti-clockwise direction as seen in Fig. 5 its roughened surface draws the front edge of the bottom sheet toward the left but when the segment starts to rock in the opposite direction, the wiper 38 pressing on the hook 37 rocks the strap 35 against a spring 42 and thus causes the fingers 36 to lift the pile of wrappers slightly so that the bottom wrapper comes forward clear of the pile and of the fingers 36 with its front edge presented to two pairs of grippers. These are formed and operated as follows:—Turning loosely on the spindle 29 and on a pin 43 co-axial with it is a sleeve 44 having on it two arms 45 terminating in jaws 46 which coöperate with lower jaws 47 on arms 48 on a second sleeve 49. Pins 50 on the arms 45 enter slots 51 in the arms 48 and limit the relative movement of these arms which is caused by a cam 52 on the spindle 29 coming against a roller on a tailpiece 53 on the sleeve 49 while springs 54 tend to keep the jaws 47 up against the jaws 46. The jaws 47 thus receive a reciprocating motion at right angles to the axis of the spindle 29, the lower ends of the arms 48 being slotted for the purpose. On one of the arms 45 is a stud 55 linked by a rod 56 to the bowl 57 of a cam 58 on the way shaft 25 and both pairs of arms 45 and 48 are thus rocked about the spindle 29. The arrangement is such that when the segment 23 presents a wrapper to them the jaws 47 close against the wrapper and grip it and the arms are then rocked by the cam 58 so as to bring the wrapper into a vertical position against two vertical plates 59 (see Figs. 1, 5 and 16) at the adjacent edges of which are two rollers 60. As the arms move down the head of one of the pins 50 comes against a blade 61 carried on a fixed pivot 62 and rocks it so that it follows up the wrapper and holds it in position against the plates 59.

While the wrapper is thus held paste is applied to it as follows:—63 is a paste box in which a roller 64 is rotated by toothed gear 65 from the spindle 39. Over the roller 64 is moved a pasting arm 66 (see Figs. 1, 2 and 6) carried by a rod 67 which can slide through a sleeve 68 mounted in fixed bearings 69. The rod is carried by a lever 70 rocked about a fixed pivot 71 by a cam 72 on the shaft 2 by which means the rod is pushed through the sleeve 68 gathering paste from the surface of the roller and passing clear thereof. The sleeve is then turned by a rack 73 which engages a ring of teeth 74 upon the sleeve, the rack being reciprocated by a cam 75 on a shaft 76 constantly rotated by the bevel wheel 24. By the turning of the sleeve the rod 67 is rocked about its axis bringing the arm 66 against the wrapper and thus depositing paste upon it. Meanwhile a funnel 18 has been dropped as will be hereafter described onto the tops of the plates 59 and behind the wrapper and a ram or pusher 77 (see Figs. 1 and 16) actuated by a cam 78 on the shaft 2 and a lever 79 pivoted at 80 pushes the funnel past the rollers 60 and in between the plates 17 of one of the molds on the ring 12. As the ram begins to advance, the grippers open releasing the paper, move down a little lower out of the way and then return into position to receive the next wrapper. The paper is thus pushed by the funnel in between the mold plates 17, leaving two flaps sticking out radially. The right hand flap is then folded over the funnel by a blade formed on an arm 81 (see Figs. 7 and 8) on a spindle 82 rocked by a link 83 from a cam 84 on the main shaft. The mold ring now begins to turn and the left hand or leading flap is thus brought against the edge of a shield 85 which encircles the ring for three quarters of its periphery and this edge folds the flap over on to the right hand flap to which it adheres by reason of the paste. The shield 85 is omitted from Fig. 1. When the ring next stops the bottom of the wrapper is folded in under the bottom of the funnel, see Figs. 9 and 10.

A pair of folding arms 86 pivoted on fixed pivots 87 are connected by short links 88 to a rod 89 to which a vertical reciprocating movement is imparted by a cam 90 on the shaft 76. By this means the arms 86 are rocked toward the axis of the funnel in a radial plane and they thereby fold the wrapper in. A folding blade 91 carried on an arm 92 on a fixed pivot 93 is then operated by a link 94 on the arm 81 (see Figs. 7 and 9) and folds in the right hand side flap while the left hand flap is folded in by the edge 95 of the annular plate 16, past which it is carried by the movement of the ring. At the next stop of the ring a plunger 96 (see Figs. 1 and 2) may be arranged to enter the funnel and press the bottom of the package so as to render the bottom more secure. This plunger is carried by a rod 97 moved in guides 98 by a link 99 and lever 100 rocked about a fixed pivot 101 by a cam 102 on the shaft 5. The funnel and package next arrive beneath the chute 103 of the measuring machine shown in detail in Figs. 11 and 12. This consists of a cylindrical casing 104 in the bottom of which are four measuring pockets formed of blocks 105 carried between angle-plates 106 fast on a spindle 107 driven by bevel gear 108 (see Fig. 3) from a shaft 109 rotated by bevel gear 110 from the main shaft 2. These blocks are preferably so made that they can be set nearer to or farther from the axis in order that the size of the pockets may be adjusted with nicety and varied if desired. Just above the plates and blocks and directly over the opening into the chute a diaphragm or cut off plate 111 is provided so that as a pocket comes beneath this plate, it carries beneath it and delivers through the chute to the funnel beneath a measured quantity of the material contained in the casing 104. Opposite the point at which the funnel stops in this position and at other positions if desired the shield 85 is interrupted and a small vertical roller 112 (see Fig. 12) coated with rubber or some suitable substance is mounted in such a way as to give a slight pressure to the side flaps of the package to set the paste. At the next stop a reciprocating plunger 113 enters the package and rams down the material in it. The plunger is operated by a pin 114 on a crank disk 115 on the cross shaft 5. This plunger may be repeated if desired.

Nothing further happens to the package until it arrives at the position diametrically opposite that at which it was inserted into the mold but at this point the funnel is lifted from the package as shown in Figs. 13 to 16. As the funnel arrives it enters and seats itself in a lifter 116 carried on a vertical rod 117 actuated by a cam 118 and a plunger 119 descends and rests upon the top of the material in the package and so prevents it from being drawn out when the funnel is raised. This plunger is carried on a pin 120 supported by two cheeks 121 on a slide 122 operated by a connecting rod 123 from a pin 124 on a crank disk 125 on the shaft 2. Also pivoted on the pin 120 is a pair of hooks 126 connected by a spring 127 to the back of the cheeks 121 but normally held in the vertical position as shown in Fig. 13 against the pull of the spring by a stop 128 on the plunger. When the lifter 116 rises, carrying the funnel with it, the trunnions 129 on the funnel are engaged by the hooks, see Fig. 15. As the funnel moved up, its top met a cross piece 130 connected by a spring 131 to the bottom of the plunger and moved this piece upward extending the spring. The slide 122 now rises and the funnel is lifted clear of the lifter 116. The plunger 119 is provided with rollers of which the upper one 132 runs on a guide 133 while two lower rollers 134 run on guides 135 which are so shaped that as the rollers reach the top of their travel, the plunger is tilted as shown in Fig. 16. As the plunger so tilts, the stop 128 moves out of the way and the spring 127 tilts the hooks through a small angle but they cannot follow the stop 128 throughout its travel as they come against the cheeks 121. The plunger therefore moves the funnel so that its trunnions 129 are freed from the hooks 126. The spring 131 is now free to contract and the cross piece 130 therefore pushes the funnel off the plunger as will be understood from Fig. 16.

Two parallel chains 136 run right across the machine from two sprocket wheels 137 on a spindle 138 over guide pulleys 139 and 140 the spindle 138 being rotated by a chain 141 from a chain wheel 142 on the cross shaft 5. These chains catch and support the trunnions of the falling funnel and transport the funnel to the far side of the mold ring. Fast with the pulleys 140 are disks 143 each of which has in its periphery a notch 144 adapted to receive one of the trunnions 129. The trunnions are prevented by guides 145 from falling out of the notches until the funnel reaches the position where we first met with it namely resting on the plates 59 ready for the ram 77 to push it again into a mold. These disks insure the funnels being presented at the correct time in front of the ram. Fixed guide plates 146 may be provided between which the lower part of the funnel passes.

In order to prevent oscillation of the funnel which might interfere with the wrapper feed there may be provided a long arm 147 carried on a bridge piece 148 pivoted at 149 to the plates 146 and resting on the axles of the disks 143. The end of this arm rests on the right hand edge of a funnel as it is carried down by the disks and prevents such edge rising and thereby the bottom of the funnel is prevented from swinging out to the right and fouling the wrapper box and feed mechanism see Fig. 1. A wiper 150 on one of the disks 143 raises the arm 147 at the proper time to allow a funnel to pass beneath it.

At the next stop of the ring, the top of the package is folded in and pasted (see Figs. 17 and 18). A bevel pinion 151 (see Fig. 3) on the main shaft drives a shaft 152 on which are two cams 153, 154 imparting vertical reciprocating movements to two rods 155, 156. The rod 155 rocks a pair of bell cranks 157 about their pivots 158 while the rod 156 carries a pair of links 159. The upper ends of the bell cranks are connected to the upper ends of these links by a pair of short links 160, carrying a pair of folding blades 161, the whole being so arranged that when a package stops beneath them the blades move from the position shown in dots in Fig. 17 downward and inward to the position shown in full lines folding the top of the wrapper down upon the material contained in it, and then move apart horizontally. The following or right hand flap as seen from the point of view of Fig. 18 is then folded down by a blade 162 on an arm 163 carried by a spindle 164 which is rocked by means of an arm 165 upon it connected by a rod 166 to the bowl of a cam 167 on the shaft 152. Paste is then applied to the leading or left hand flap by an arm 168 on a vertical spindle 169 uniformly rotated by bevel gear 170 from the shaft 152. In its revolution this arm passes over and gathers paste from a roller 171 rotated (by bevel gear 172 from the spindle 169) in a paste box 173. The mold ring now moves on again and the last flap just mentioned meets the edge of a plate 174 by which it is folded over onto the top of the package to which it adheres by reason of the paste upon it. The plate 174 may be steam heated in order to dry the paste. At some convenient position, for instance that midway between the positions at which the funnels are removed from and inserted into the ring, the package may be ejected from the mold, see Fig. 19. An ejector 175 is carried by an arm 176 to which a vertical reciprocating movement is imparted by a cam 177 on a cross shaft 178 rotated by the bevel wheel 4. At each stoppage of the mold ring the ejector descends and pushes the package down through the slot 179 which is provided in the plate 16 for this purpose.

What I claim is:—

1. In a packeting machine, a rotating ring, molds therein, a funnel adapted to be inserted into the molds, means for lifting the funnel out of the molds, and a moving chain adapted to transport the funnel from the place where it is lifted from the molds to the place where it is to be again inserted therein.

2. In a packeting machine, a rotating ring, molds therein, a funnel adapted to be inserted into the molds, means for lifting the funnel out of the molds, and a pair of moving chains adapted to support the funnel on either side and to transport it from the place where it is lifted from the molds to the place where it is to be again inserted therein.

3. In a packeting machine, a rotating ring, molds therein, a funnel adapted to be inserted into the molds, means for lifting the funnel out of the molds, a pair of trunnions on the funnel, a pair of moving chains adapted to support the trunnions, a pair of notched disks adapted to receive the funnel and deliver it at the proper time and position for insertion into a mold, and means for rotating the disks.

4. In a packeting machine, a rotating ring, molds therein, a funnel adapted to be inserted into the molds, a lifter adapted to lift the funnel out of the molds, a carriage, hooks on the carriage adapted to receive the funnel from the lifter, means for raising the carriage and for tilting it at the top of its travel to release the funnel, a pair of moving chains adapted to receive the funnel as it falls from the carriage and to transport it to the place where it is to be again inserted into a mold.

5. In a packeting machine, a rotating ring, molds therein, a funnel adapted to be inserted into the molds, a pair of trunnions on the funnel, a lifter adapted to lift the funnel out of the molds, a carriage, hooks on the carriage adapted to receive the trunnions on the funnel, means for raising the carriage and for tilting it at the top of its travel to release the funnel, a pair of moving chains adapted to support the trunnions, a pair of notched disks adapted to receive the funnel and deliver it at the proper time and position for insertion into a mold, and means for rotating the disks.

6. In a packeting machine, a rotating ring, molds therein, means for presenting a funnel in front of a mold, means for delivering a wrapper between the mold and the funnel, a reciprocating pusher adapted to push the funnel and wrapper into the mold, means for folding the wrapper around the funnel, means for delivering a measured quantity of material to the funnel, means for lifting the funnel out of the molds, and a moving chain adapted to transport the funnel from the place where it is lifted from the molds to the place where it is to be again inserted therein.

7. In a packeting machine, a rotating ring, molds therein, means for presenting a funnel in front of a mold, means for delivering a wrapper between the mold and the funnel, a reciprocating pusher adapted to push the funnel and wrapper into the mold, means for folding the wrapper around the funnel, means for delivering a measured quantity of material to the funnel, means for lifting the funnel out of the molds, a moving chain adapted to transport the funnel from the place where it is lifted from the molds to the place where it is to be again inserted therein, and means for closing the package.

8. In a packeting machine, a rotating ring, molds therein, means for presenting a funnel in front of a mold, means for delivering a wrapper between the mold and the funnel, a reciprocating pusher adapted to push the funnel and wrapper into the mold, means for pasting the wrapper, means for folding the wrapper around the funnel, means for delivering a measured quantity of material to the funnel, means for lifting the funnel out of the molds, and a moving chain adapted to transport the funnel from the place where it is lifted from the molds to the place where it is to be again inserted therein.

9. In a packeting machine, a rotating ring, molds therein, means for presenting a funnel in front of a mold, means for delivering a wrapper between the mold and the funnel, a reciprocating pusher adapted to push the funnel and wrapper into the mold, a paste trough, a roller rotating therein, a rod moving in bearings, an arm carried by the rod and capable of passing over the surface of the roller, means for sliding the rod through its bearings, means for turning the rod about its axis, means for folding the wrapper around the funnel, means for delivering a measured quantity of material to the funnel, means for lifting th funnel out of the molds, and a moving chain adapted to transport the funnel from the place where it is lifted from the molds to the place where it is to be again inserted therein.

EDWARD THOMAS POLLARD.

Witnesses:
AXEL GOTTSCHAU,
T. R. JONES.